United States Patent
Izumi

(10) Patent No.: US 7,623,791 B2
(45) Date of Patent: Nov. 24, 2009

(54) OPTICAL SIGNAL MULTIPLEXING DEVICE AND OPTICAL SIGNAL MULTIPLEXING METHOD

(75) Inventor: Futoshi Izumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/078,059

(22) Filed: Mar. 26, 2008

(65) Prior Publication Data

US 2008/0181610 A1 Jul. 31, 2008

Related U.S. Application Data

(63) Continuation of application No. PCT/JP2005/017781, filed on Sep. 27, 2005.

(51) Int. Cl.
*H04J 14/08* (2006.01)
(52) U.S. Cl. .......................... 398/102; 398/98
(58) Field of Classification Search ............. 398/98, 398/102
See application file for complete search history.

(56) References Cited

U.S. PATENT DOCUMENTS

| | | | |
|---|---|---|---|
| 7,206,509 B2* | 4/2007 | Beacken | 398/53 |
| 2002/0126346 A1* | 9/2002 | Suzuki et al. | 359/123 |
| 2004/0258352 A1 | 12/2004 | Takeyama et al. | |
| 2005/0047791 A1 | 3/2005 | Miyazaki | |
| 2005/0190432 A1 | 9/2005 | Futami et al. | |
| 2005/0213985 A1* | 9/2005 | Stephens et al. | 398/140 |
| 2007/0065162 A1 | 3/2007 | Kikuchi | |

FOREIGN PATENT DOCUMENTS

| | | |
|---|---|---|
| JP | 7-221708 | 8/1995 |
| JP | 9-181380 | 7/1997 |
| JP | 2002-208894 | 7/2002 |
| JP | 2003-309521 | 10/2003 |
| JP | 2004-356742 | 12/2004 |
| JP | 2005-17385 | 1/2005 |
| JP | 2005-79833 | 3/2005 |
| JP | 2005-241902 | 9/2005 |

OTHER PUBLICATIONS

International Search Report mailed on Dec. 13, 2005 in connection with International Application No. PCT/JP2005/017781.
"Wideband multiwavelength mass optical frequency shifter using quasi-phase matched $LiNbO_3$ wavelength conversion element", NTT Photonics Laboratories, Introduction of Research Results 9-4, 2003.

* cited by examiner

*Primary Examiner*—Nathan M Curs
(74) *Attorney, Agent, or Firm*—Fujitsu Patent Center

(57) ABSTRACT

An optical signal multiplexing device includes a delay-amount adjusting unit that converts wavelengths of optical signals to be multiplexed when the optical signals are obtained, and adjusts delay amounts of the optical signals by passing the wavelength-converted optical signals through waveguides that generate propagation delays corresponding to the wavelengths in the optical signals. The optical signal multiplexing device also includes a waveform-degradation compensation unit that compensates for degradation of a waveform of the optical signals while keeping a difference of propagation delay times between the optical signals delay amounts of which are adjusted by the delay-amount adjusting unit.

10 Claims, 18 Drawing Sheets

FIG.3
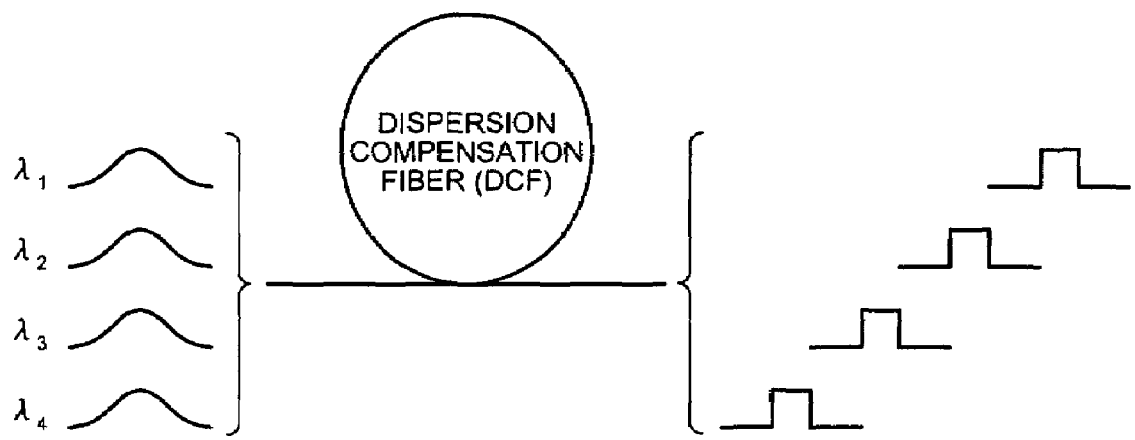
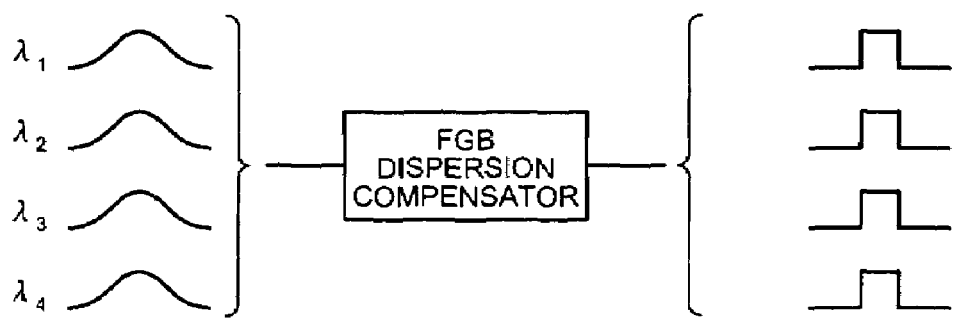
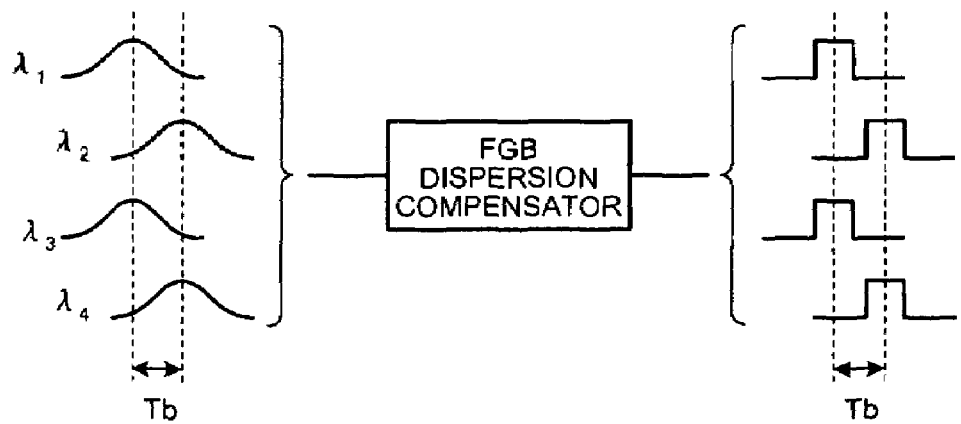

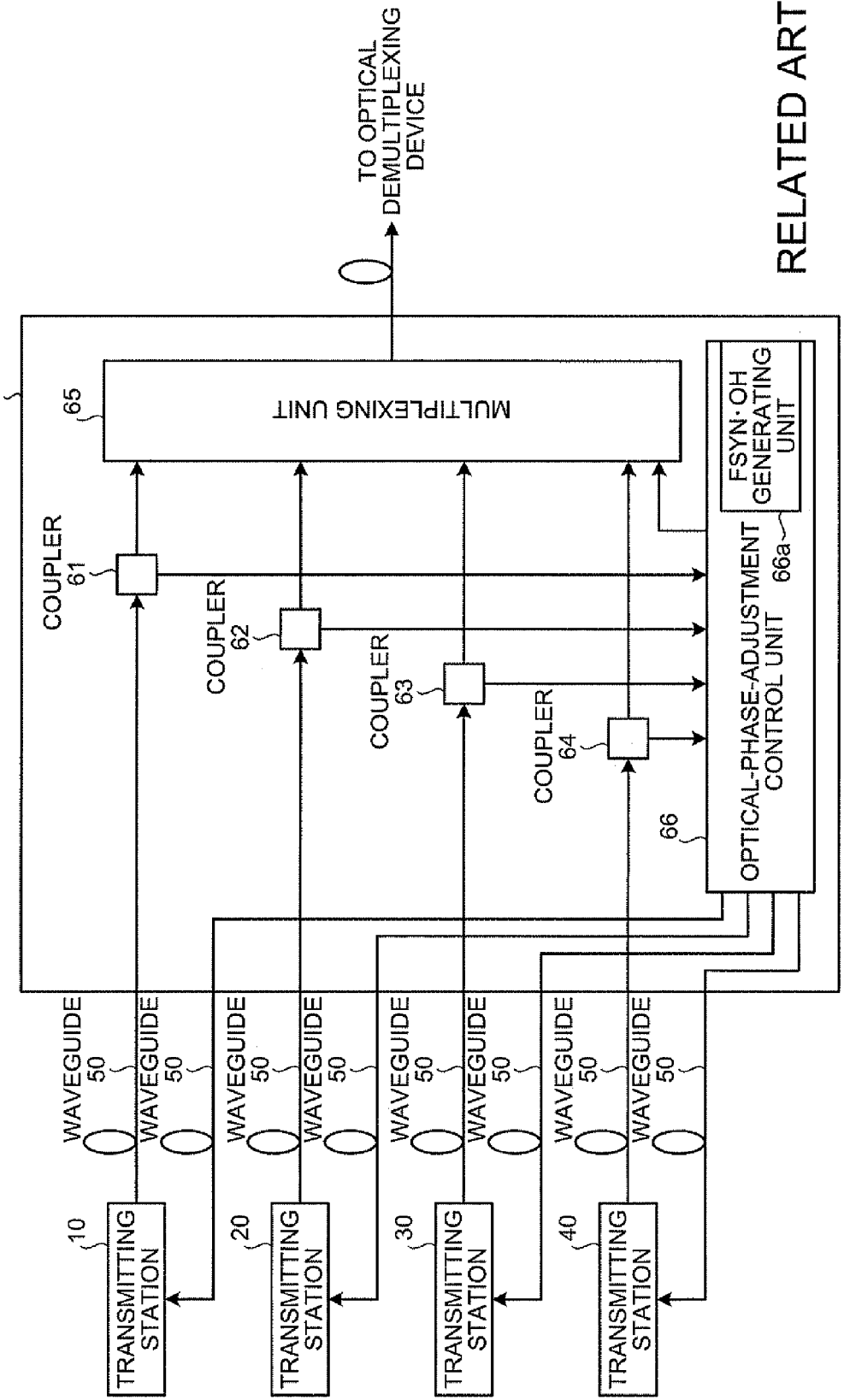

OPTICAL SIGNAL MULTIPLEXING DEVICE AND OPTICAL SIGNAL MULTIPLEXING METHOD

This application is a continuing application, filed under 35 U.S.C.§111(a), of International Application PCT/JP2005/017781, filed Sept. 27, 2005, the contents of which are incorporated herein by reference.

BACKGROUND OF THE INVENTION

1. Field of the Invention

The present invention relates to an optical signal multiplexing device that multiplexes optical signals by an optical time-division multiplexing system.

2. Description of the Related Art

In recent years, in an optical fiber communication system, OTDM (Optical Time Division Multiplex) for time-division multiplexing optical signals directly in the state of light is being studied. In multiplexing optical signals, an optical multiplexing device that performs this OTDM multiplexing adjusts phases of the optical signals, by remote controlling transmitting stations that output the optical signals, and OTDM multiplexes the optical signals using the optical signals of which phases are adjusted in advance.

Japanese Patent Application Laid-open No. H7-221708 discloses a technique of compensating for a delay of an optical signal generated by an optical path difference within a node, using dispersion dependency of an optical fiber on a wavelength, when the optical signal passes within each node that constitutes an optical fiber communication system, thereby achieving a precise synchronization of the optical signal concerning the optical fiber communication system.

However, according to the conventional technique described above, because the phases of the optical signals need to be adjusted beforehand by remote-controlling the transmitting stations, there has been a problem in that optical signals of which phases are not adjusted beforehand cannot be OTDM multiplexed.

To progress the use of light in the network, the cost of processing an optical signal directly in the state of light needs to be lower than the cost of converting an optical signal into an electric signal. In other words, in processing light directly in the state of light, when the optical signals cannot be multiplexed simply due to the fact that the phases of the optical signals are not adjusted beforehand, it is considered unlikely that the use of optical signals in the network becomes popular by replacing the electric signals that can be flexibly processed.

SUMMARY OF THE INVENTION

It is an object of the present invention to at least partially solve the problems in the conventional technology.

According to an aspect of an embodiment, an optical signal multiplexing device is for multiplexing optical signals by an optical time-division multiplexing system. The optical signal multiplexing device includes a delay-amount adjusting unit that converts wavelengths of optical signals to be multiplexed when the optical signals are obtained, and adjusts delay amounts of the optical signals by passing the wavelength-converted optical signals through waveguides that generate propagation delays corresponding to the wavelengths in the optical signals; and a waveform-degradation compensation unit that compensates for degradation of a waveform of the optical signals while keeping a difference of propagation delay times between the optical signals delay amounts of which are adjusted by the delay-amount adjusting unit.

According to another aspect of an embodiment, an optical signal multiplexing method is for multiplexing optical signals by an optical time-division multiplexing system. The optical signal multiplexing method includes converting wavelengths of optical signals to be multiplexed when the optical signals are obtained; adjusting delay amounts of the optical signals by passing the wavelength-converted optical signals through waveguides that generate propagation delays corresponding to the wavelengths in the optical signals; and compensating for degradation of a waveform of the optical signals while keeping a difference of propagation delay times between the optical signals having the adjusted delay amounts.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an explanatory diagram for explaining a difference between a dispersion fiber (DCF) and an FGB dispersion compensator (a VIPA dispersion compensator);

FIG. 20 is an explanatory diagram for explaining a conventional OTDM.

DETAILED DESCRIPTION OF THE PREFERRED EMBODIMENTS

Figure 1:
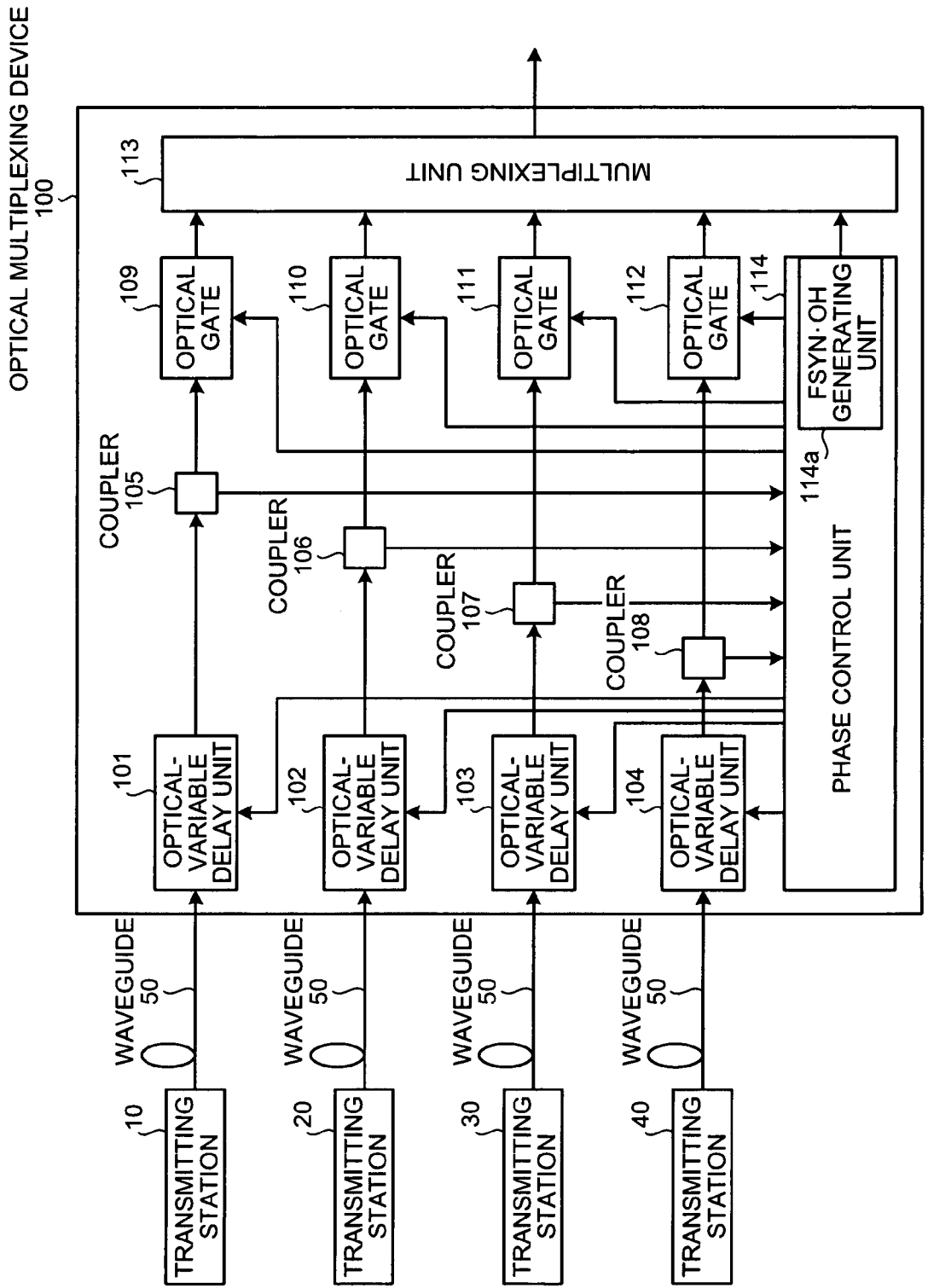
FIG. 1 is a functional block diagram of a configuration of an optical multiplexing device according to a first embodiment.

Exemplary embodiments of an optical signal multiplexing device according to the present invention will be explained below in detail with reference to the accompanying drawings. Note that the invention is not limited to the embodiments.

First, characteristics of the present invention are explained in comparison with characteristics of a conventional technique. FIG. 20 is an explanatory diagram for explaining a conventional OTDM (Optical Time Division Multiplex) system. As shown in FIG. 20, an optical multiplexing device 60 that multiplexes optical signals transmitted from transmitting stations 10 to 40 include couplers 61 to 64, a multiplexing unit 65, and an optical-phase-adjustment control unit 66.

The couplers 61 to 64 are devices that branch an optical input signal into two or more outputs. For example, the coupler 61 branches an optical signal input from the transmitting station 10 into two optical signals, inputs one of the optical signals to the multiplexing unit 65, and inputs the other optical signal to the optical-phase-adjustment control unit 66. The multiplexing unit 65 is a processing unit that combines (time-division multiplexes) the optical signals input from the couplers 61 to 54 with an optical signal input from an FSYN·OH (frame SYNchronization OverHead)generating unit 66a, and transmits the combined optical signal to an optical demultiplexing device. The optical demultiplexing device receives optical signals combined by the multiplexing unit 65, and demultiplexes the received optical signals.

The optical-phase-adjustment control unit 66 is a processing unit that monitors the phases of the optical signals input from the transmitting stations 10 to 40, and remote controls the phases of the optical signals transmitted from the transmitting stations 10 to 40. The optical-phase-adjustment control unit 66 also includes an FSYN·OH generating unit 66a. The FSYN·OH generating unit 66a is a processing unit that generates data (hereinafter, described as overhead data) such as a synchronization fixed pattern, monitoring-signal line data, and order wire data, and transmits the generated overhead data to the optical demultiplexing device. The overhead data is also used to transfer a communication alarm.

However, the optical multiplexing device 60 shown in FIG. 20 needs to remote control the phases of the optical signals transmitted from the transmitting stations 10 to 40, and OTDM multiplex the optical signals, and has a problem in that the optical multiplexing device 60 cannot multiplex optical signals that are not phase controlled in advance.

An optical multiplexing device according to a first embodiment receives optical signals transmitted from the transmitting stations 10 to 40 (timings of these optical signals are different), without remote controlling the phases of the optical signals transmitted from the transmitting stations 10 to 40, adjusts the timings of the received optical signals in the state of light, and executes the OTDM multiplexing.

A configuration of the optical multiplexing device according to the first embodiment is explained below. FIG. 1 is a functional block diagram of the configuration of the optical multiplexing device according to the first embodiment. As shown in FIG. 1, an optical multiplexing device 100 according to the first embodiment includes optical-variable delay units 101 to 104, couplers 105 to 108, optical gates 109 to 112, a multiplexing unit 113, a phase control unit 114, and an FSYN·OH generating unit 114a. The couplers 105 to 108 are similar to the couplers 61 to 64 shown in FIG. 20, and therefore explanations thereof will be omitted.

The optical-variable delay units 101 to 104 are processing units that perform delay adjustment of optical signals transmitted from the transmitting stations 10 to 40, following control signals input from the phase control unit 114. The optical-variable delay units 101 to 104 have mutually the same configurations, and therefore, the configuration of the optical-variable delay unit is explained using the optical-variable delay unit 101 as one example.

Figure 2:
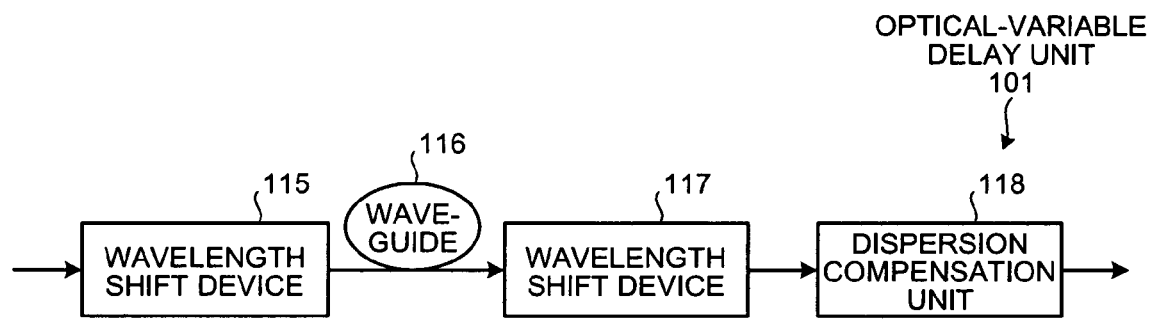
FIG. 2 is a functional block diagram of a configuration of an optical-variable delay unit.

FIG. 2 is a functional block diagram of a configuration of the optical-variable delay unit. As shown in FIG. 2, the optical-variable delay unit 101 includes wavelength shift devices 115 and 117, a waveguide 116, and a dispersion compensation unit 118. The wavelength shift device 115 converts (shifts) the wavelength of an optical signal. The optical signal of which wavelength is converted by the wavelength shift device 115 passes through the waveguide 116 so that a propagation delay corresponding to the converted wavelength occurs in the optical signal. The wavelength shift device 115 adjusts the shift amount of the wavelength to be converted, corresponding to the control signal input from the phase control unit 114, and adjusts the propagation delay amount.

The wavelength shift device 117 arranges the wavelengths of optical signals converted by the wavelength shift device 115 to a specific wavelength. The dispersion compensation unit 118 is a device that returns the dispersed waveforms attributable to the passing of the wavelength-shifted optical signal through the waveguide 116, to the original state.

In this case, for the dispersion compensation unit 118, a special dispersion compensation unit such as an FBG (fiber Bragg grating) and a VIPA (Virtually Imaged Phased Array) is used, and a dispersion compensation fiber such as a DCF (Dispersion Compensation Fiber) is not used. FIG. 3 is an explanatory diagram for explaining a difference between a dispersion fiber (DCF) and an FBG dispersion compensator (a VIPA dispersion compensator).

As shown in FIG. 3, when the dispersion compensation fiber is used to return the waveforms of the optical signals to the original waveforms, timings of the wavelengths contained in the optical signals are deviated (the deviation amount of timings changes depending on the length of the dispersion compensation fiber). While the distortion of the wavelengths becomes large corresponding to the delay-adjusted amount, when this distortion is attempted to be dispersion-compensated by the dispersion compensation fiber, there is a risk that the delay adjustment is offset.

Figure 4:
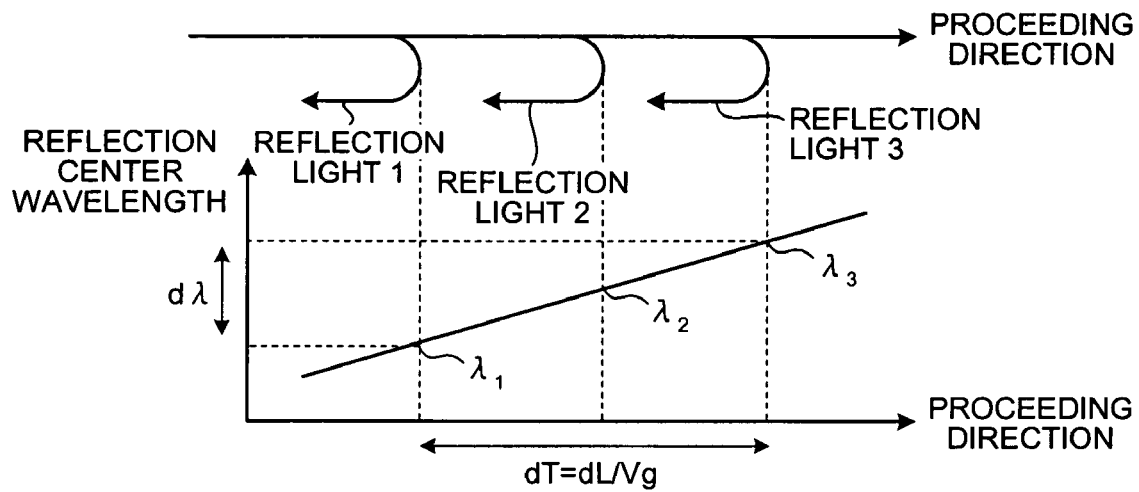
FIG. 4 is an explanatory diagram for explaining an FGB dispersion compensator.

On the other hand, as shown in FIG. 3, by using the FGB dispersion compensator, the above problem, that is, the problem of deviation of the timings of the wavelengths and the problem of the offset of the delay adjustment amount can be solved. The FBG dispersion compensator is explained below. FIG. 4 is an explanatory diagram for explaining the FBG dispersion compensator.

As shown in FIG. 4, the FBG dispersion compensator uses a fiber grating filter. This fiber grating filter reflects only a specific wavelength, by changing the refractive index of the waveguide in a specific cycle. That is, by changing the cycle at stages, reflection points of wavelengths can be shifted, thereby compensating for the wavelength dispersion. In the example shown in FIG. 4, dispersion of $dT/d\lambda$ (ps/nm) can be compensated for. In this case, $d\lambda$ denotes a difference between $\lambda_1$ (where, $\lambda_1$ denotes a wavelength of a reflection light 1) and $\lambda_3$ (where, $\lambda_3$ denotes a wavelength of a reflection light 3), and dT denotes a difference between the reflection light 1 and the reflection light 3 (where, dL denotes a distance from the reflection light 1 to the reflection light 3, and Vg denotes a speed of wave). The VIPA dispersion compensator uses a VIPA plate, and a free-curved surface mirror as a reflection unit.

Figure 5:
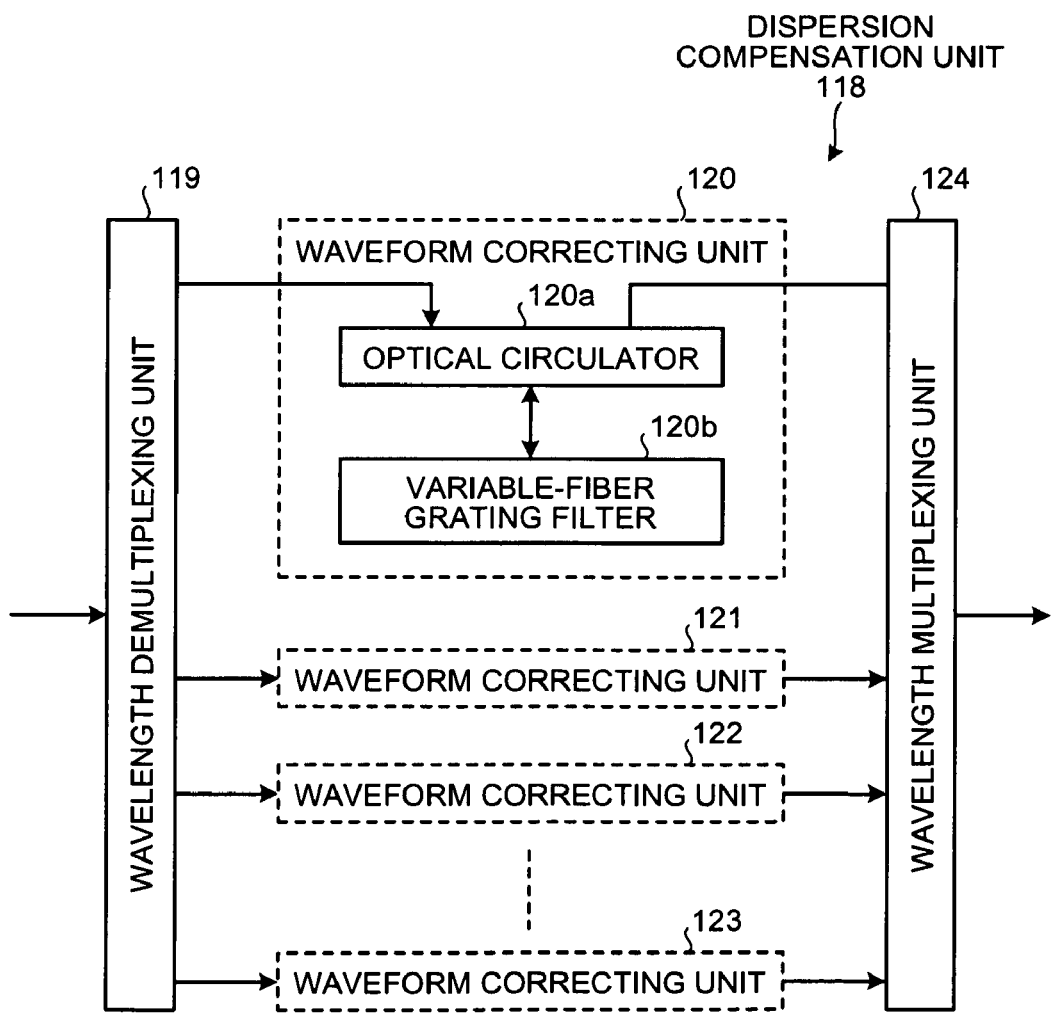
FIG. 5 is a functional block diagram of a configuration of a dispersion compensation unit.

A configuration of the dispersion compensation unit 118 shown in FIG. 2 is explained next. FIG. 5 is a functional block diagram of the configuration of the dispersion compensation unit. As shown in FIG. 5, the dispersion compensation unit 118 includes a wavelength demultiplexing unit 119, waveform correcting units 120 to 123, and a wavelength multiplexing unit 124. The wavelength demultiplexing unit 119 is a processing unit that demultiplexes each signal contained in the optical signal, for each wavelength, and inputs the demultiplexed optical signals to the waveform correcting units 120 to 123.

The waveform correcting units 120 to 123 are processing units that return the waveforms of the optical signals to the original waveforms. The waveform correcting units 120 to 123 have mutually the same configurations, and therefore, the waveform correcting unit is explained using the waveform correcting unit 120. The waveform correcting unit 120 includes an optical circulator 120a and a variable-fiber grating filter 120b.

The optical circulator 120a is a device that inputs the optical signal obtained from the wavelength demultiplexing unit 119, to the variable-fiber grating filter 120b, and inputs the dispersion-compensated optical signal output from the variable-fiber grating filter 120b, to the wavelength multiplexing unit 124. The variable-fiber grating filter 120b is similar to the fiber grating filter shown in FIG. 4, and therefore explanations thereof will be omitted.

When the optical multiplexing device 100 is to perform the OTDM multiplexing by extracting only a part of the waveform even when the waveforms of the optical signals are distorted, the dispersion compensation unit 118 shown in FIG. 2 can be omitted.

Referring back to the explanation of FIG. 1, the optical gates 109 to 112 are devices that extract optical signals input from the optical-variable delay units 101 to 104, at a predetermined timing, by performing on and off based on control signals input from the phase control unit 114. The multiplexing unit 113 is a processing unit that combines optical signals input from the optical gates 109 to 112 and overhead data input from the phase control unit 114, and transmits the combined signal to other device (such as an optical demultiplexing device).

The phase control unit 114 is a processing unit that changeover controls the optical gates 109 to 112, and adjusts the delay amount of the optical signals, by controlling the optical-variable delay units 101 to 104. The phase control unit 114 adjusts the delay amount of the optical signals of the optical-variable delay units 101 to 104 so that there are no change points of data output from the optical-variable delay units 101 to 104, at timings of changing over between the optical gates 109 to 112.

Figure 6:
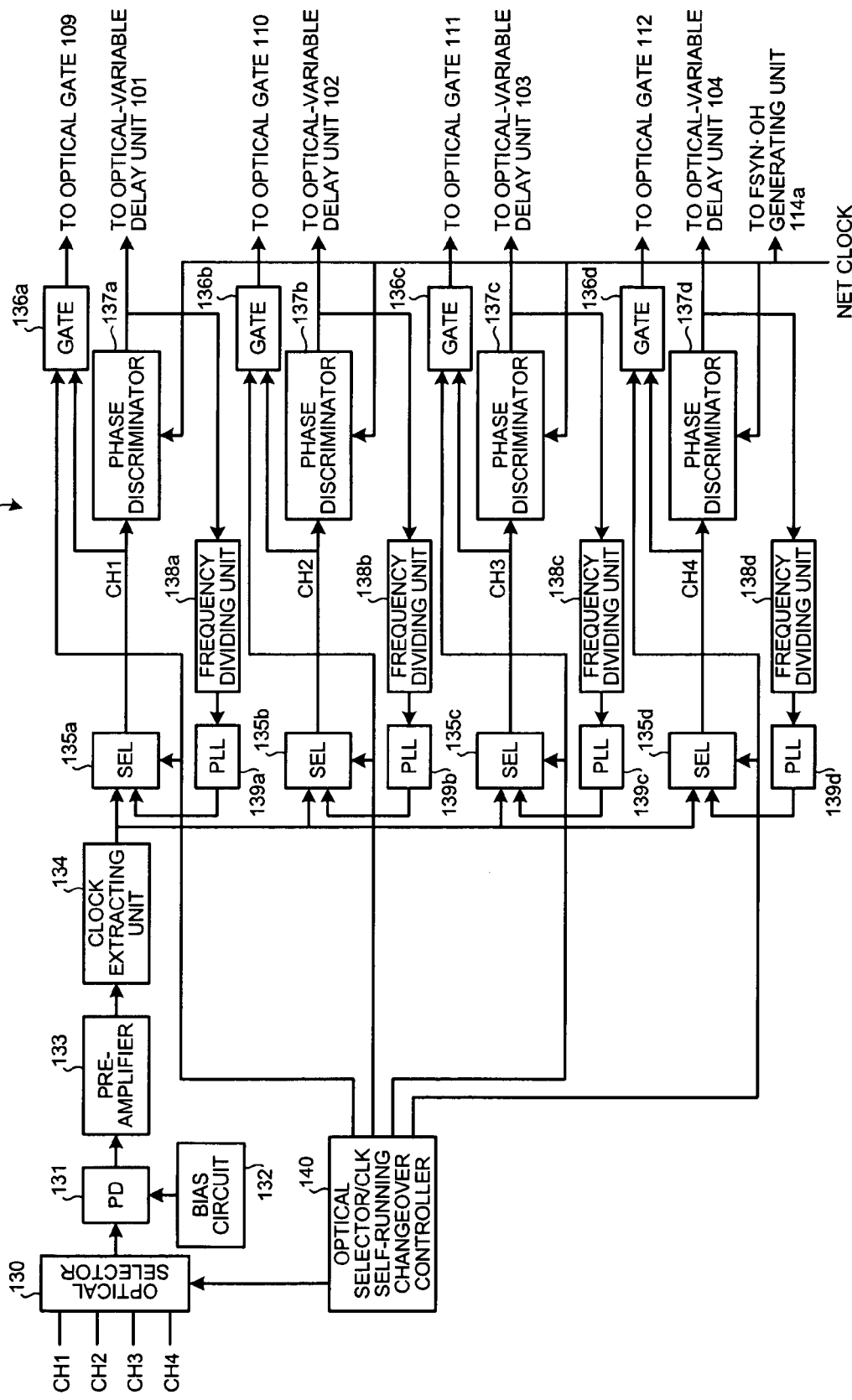
FIG. 6 is a functional block diagram of a configuration of a phase control unit shown in FIG. 1.

Next, the configuration of the phase control unit 114 shown in FIG. 1 is explained. FIG. 6 is a functional block diagram of the configuration of the phase control unit shown in FIG. 1. As shown in FIG. 6, the phase control unit 114 includes an optical selector 130, a PD 131, a bias circuit 132, a clock extracting unit 134, SELs 135a to 135d, gates 136a to 136d, phase discriminators 137a to 137d, frequency dividing units 138a to 138d, PLLs 139a to 139d, and an optical selector/CLK self-running changeover controller 140.

The optical selector 130 is a device that changes over between optical signals from channels, following a control signal input from the optical selector/CLK self-running changeover controller 140. The optical signals input from the couplers 105 to 108 correspond to the optical signals input from the channels (CH1 to CH4).

The PD (Photo Diode) 131 is a device that converts the optical signal input from the optical selector 130 to an electric signal. The optical signal obtained by conversion by the PD 131 is given a constant bias voltage from the bias circuit 132, and is then input to a preamplifier 133.

The preamplifier 133 is a device that amplifies the electric signal input from the PD 131. This preamplifier 133 inputs the amplified electric signal to the clock extracting unit 134. The clock extracting unit 134 is a processing unit that extracts the clock of the electric signal, and inputs the extracted clock to the SELs 135a to 135d.

The SELs (selectors) 135a to 135d are devices that change over between the input clocks, based on the control signal from the optical selector/CLK self-running changeover controller 140, and input the clocks to the phase discriminators 137a to 137d. The SELs 135a to 135d are similar to each other, and therefore, the SEL is explained using the SEL 135a. The gates 136a to 136d, the phase discriminators 137a to 137d, the frequency dividing units 138a to 138d, and the PLLs 139a to 139d are also similarly explained using the gate 136a, the phase discriminator 137a, the frequency dividing unit 138a, and the PLL 139a, respectively.

The SEL 135a obtains the clock input from the clock extracting unit 134 and the clock input from the PLL 139a by changing over between the clocks, based on the control signal from the optical selector/CLK self-running changeover controller 140, and inputs the obtained clock to the phase discriminator 137a.

Specifically, this SEL 135a obtains the clock from the clock extracting unit 134 at the timing when the optical selector/CLK self-running changeover controller 140 changes over the optical selector 130 to the channel 1. On the other hand, the SEL 135a obtains the clock from the PLL 139a at the timing when the optical selector/CLK self-running changeover controller 140 changes over the optical selector 130 to a channel other than the channel 1 (any one of the channels 2 to 5).

The gate 146a is a device that obtains the control signal from the optical selector/CLK self-running changeover controller 140 and the clock from the SEL 135a, and notifies the timing of changing over between on and off of the optical gate 109 to each optical gate 109.

The phase discriminator 137a is a device that extracts a difference between the clock input from the SEL 135a and the net clock, adjusts the net clock using the difference between the clocks, and inputs the adjusted clock signal to the optical-variable delay unit 101 and the frequency dividing unit 138a. The optical-variable delay units 101 to 104 adjust the delay amount, based on the clocks input from the phase discriminators 137a to 137d.

The frequency dividing unit 138a is a device that adjusts the frequency of the clock input from the phase discriminator 137a to a specific frequency, and inputs the adjusted clock signal to the PLL 139a. The PLL 139a is a device that makes the input signal input to the frequency dividing unit 138a coincide with the output signal output from the PLL 139a.

Returning to the explanation of FIG. 1, the phase control unit 114 includes an FSYN·OH generating unit 114a, in addition to the configuration shown in FIG. 6. This FSYN·OH generating unit 114a is a processing unit that generates overhead data such as a synchronization fixed pattern, monitoring signal line data, and order wire data, and inputs the generated overhead data to the multiplexing unit 113.

Figure 7:
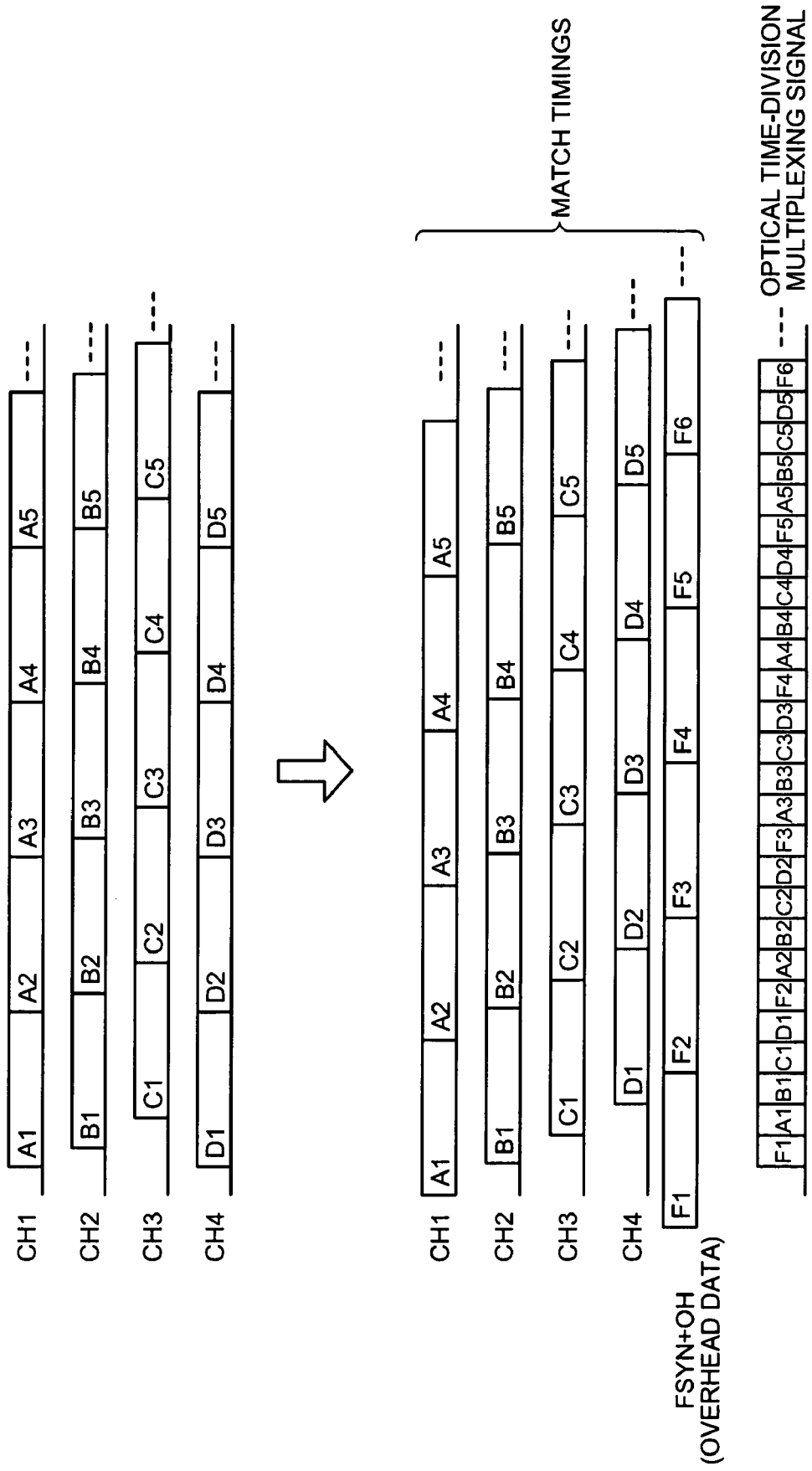
FIG. 7 is a time chart of a state that an optical multiplexing device multiplexes optical signals transmitted from transmitting stations.

A state that the optical multiplexing device 100 multiplexes the optical signals transmitted from the transmitting stations 10 to 40 is explained. FIG. 7 is a time chart of a state that the optical multiplexing device multiplexes optical signals transmitted from the transmitting stations. As shown in FIG. 7, at the point of time when the optical signals obtained from the channels (CH1 to CH4) are input to the optical multiplexing device 100, the timings of the optical signals are not consistent. However, the optical-variable delay units 101 to 104 arrange the timings of the optical signals, and the phase control unit 114 can OTDM multiplex the optical signals in the state of light by changing over between the optical gates 109 to 112.

As described above, in the optical multiplexing device 100 according to the first embodiment, the optical-variable delay units 101 to 104 receive optical signals from the transmitting stations 10 to 40, and the phase control unit 114 adjusts the delay amounts of the optical signals by controlling the optical-variable delay units 101 to 104, and changes over between the optical gates 109 to 112 at a specific timing. The multiplexing unit 113 combines the optical signals input from the optical gates 109 to 112 and the FSYN·OH generating unit 114a, and transmits the combined optical signal to other devices such as the optical demultiplexing device. Therefore, even when the timings of the optical signals transmitted from the transmitting stations 10 to 40 are inconsistent, the optical signals can be OTDM multiplexed in the state of light in high precision.

Characteristics of an optical multiplexing device according to a second embodiment are explained next. The optical multiplexing device according to the second embodiment adjusts the wavelength of the OTDM-multiplexed optical signal to a specific wavelength. When the optical multiplexing device adjusts the wavelength of the OTDM-multiplexed optical signal to a specific wavelength as described above, WDM (Wavelength Division Multiplexing) using the OTDM-multiplexed optical signal can be executed efficiently.

Figure 8:
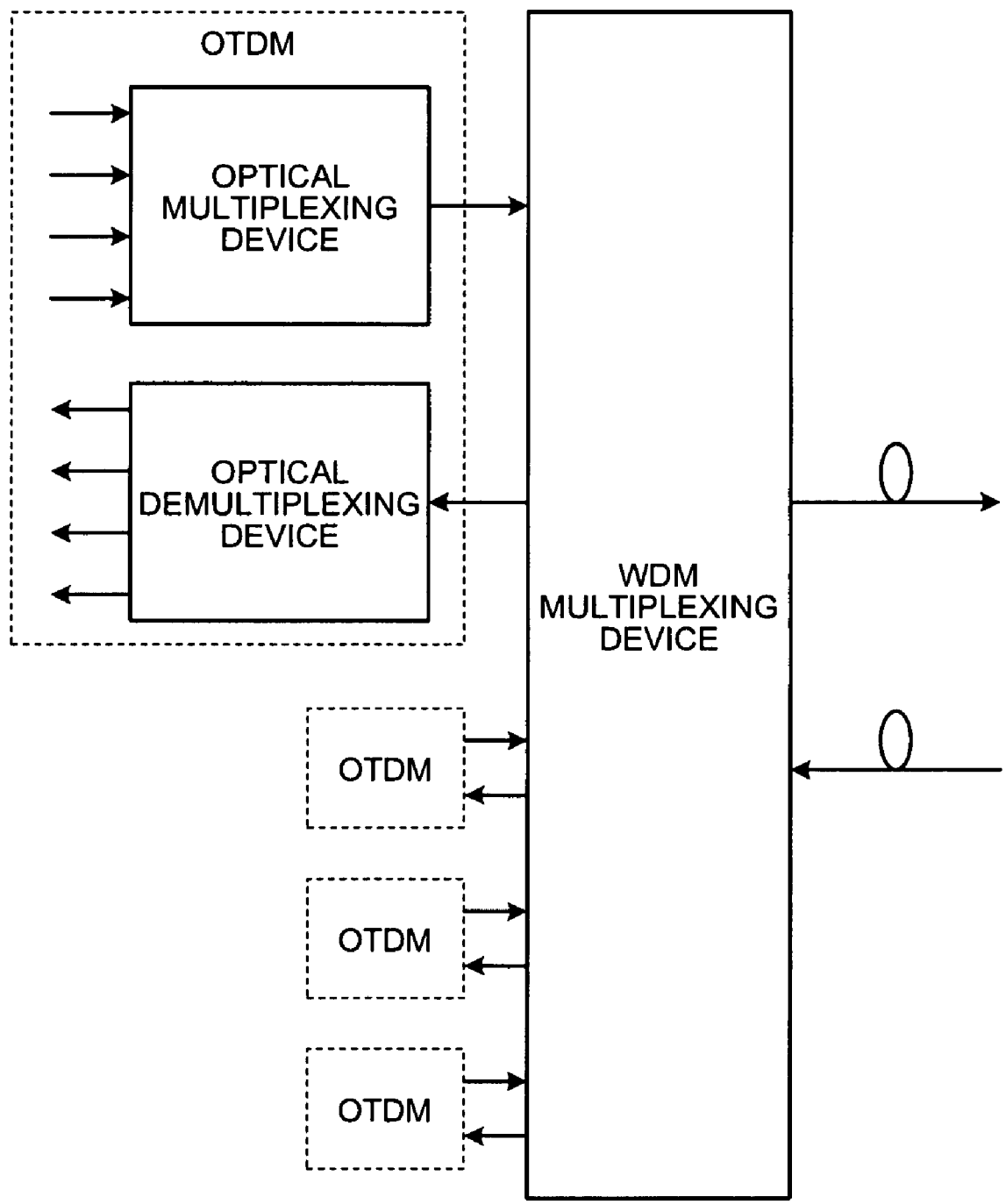
FIG. 8 is one example of a system in which an optical multiplexing device according to a second embodiment is connected to a WDM multiplexing device that performs WDM multiplexing.

FIG. 8 is one example of a system in which the optical multiplexing device according to the second embodiment is connected to a WDM multiplexing device that performs WDM multiplexing. The optical multiplexing device shown in FIG. 8 adjusts the wavelength of the OTDM-multiplexed optical signal to a specific wavelength (wavelength assigned by the WDM multiplexing device). Therefore, the WDM multiplexing device can execute a WMD multiplexing, without adjusting the wavelength of the optical signal obtained from each optical multiplexing device.

Figure 9:
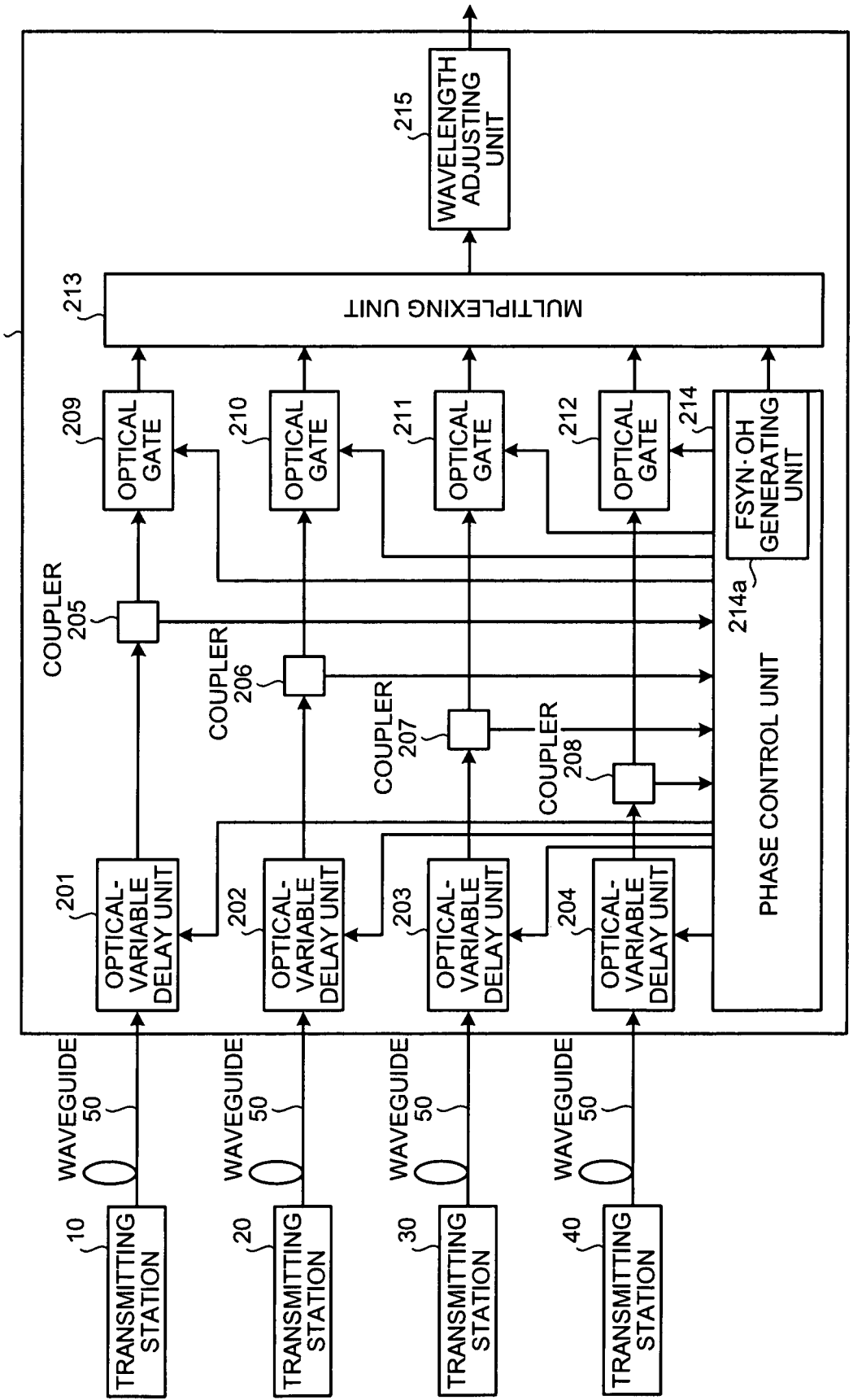
FIG. 9 is a functional block diagram of a configuration of an optical multiplexing device according to a second embodiment.

A configuration of the optical multiplexing device according to the second embodiment is explained next. FIG. 9 is a functional block diagram of the configuration of the optical multiplexing device according to the second embodiment. As shown in FIG. 9, this optical multiplexing device 200 includes optical-variable delay units 201 to 204, couplers 205 to 208, optical gates 209 to 212, a multiplexing unit 213, a phase control unit 214, and a wavelength adjusting unit 215.

The optical-variable delay units 201 to 204, the couplers 205 to 208, the optical gates 209 to 212, the multiplexing unit 213, and the phase control unit 214 are similar to the optical-variable delay units 101 to 104, the couplers 105 to 108, the optical gates 109 to 112, the multiplexing unit 113, and the phase control unit 114 shown in FIG. 1, respectively, and therefore explanations thereof will be omitted.

Figure 10:
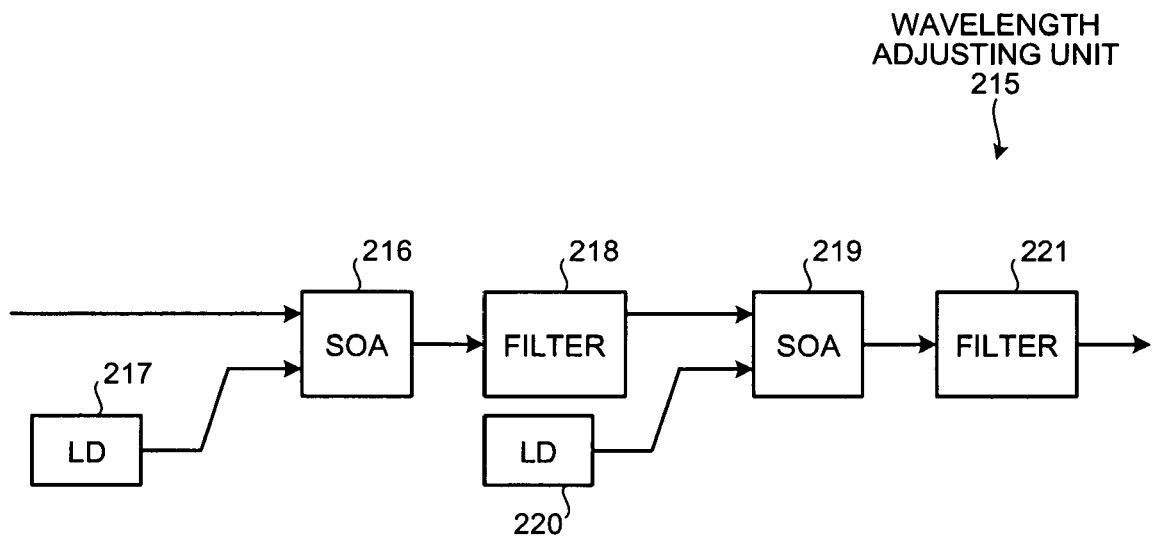
FIG. 10 is a functional block diagram of a configuration of a wavelength adjusting unit.

The wavelength adjusting unit 215 is a processing unit that adjusts the wavelength of the optical signal output from the multiplexing unit 213 to a specific wavelength (converts the wavelength to a wavelength for performing a WDM multiplexing). FIG. 10 is a functional block diagram of a configuration of the wavelength adjusting unit. As shown in FIG. 10, the wavelength adjusting unit 215 includes SOAs 216 and 219, LDs 217 and 220, and filters 218 and 221.

The SOAs (Semiconductor Optical Amplifiers) 216 and 219 are devices that convert the wavelength of the optical signals, using a cross phase modulation (XPM). An optical signal from the multiplexing unit 213 and a laser beam from the LD (Laser Diode) 217 are input to the SOA 216, and a part of the optical signal is extracted by the filter 218, thereby generating an optical signal having an inverted waveform of the original optical signal. The optical signal output from the filter 218 and the laser beam from the LD 220 are input to the SOA 219, and the optical signal output from the SOA 219 is passed through the filter 221, thereby extracting a part of the optical signal. With this arrangement, the wavelength of the original optical signal can be converted to a specific wavelength.

As described above, the optical multiplexing device 200 according to the second embodiment inputs the optical signal output from the multiplexing unit 213 to the wavelength adjusting unit 215, and converts the wavelength of the optical signal to a specific wavelength. Therefore, the WDM multiplexing device connected to the optical multiplexing device 200 can efficiently WDM multiplex the OTDM multiplexed optical signal.

Figure 11:
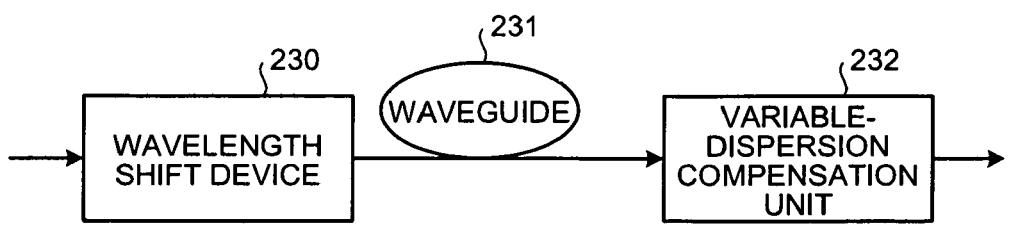
FIG. 11 is a modification of a configuration of a wavelength adjusting unit.

The configuration of the wavelength adjusting unit 215 is not limited to that shown in FIG. 10, and the wavelength adjusting unit 215 can also adjust the wavelength in the configuration shown in FIG. 11. FIG. 11 depicts a modification of the configuration of the wavelength adjusting unit. As shown in FIG. 11, this wavelength adjusting unit includes a wavelength shift device 230, a waveguide 231, and a variable-dispersion compensation unit 232.

That is, the wavelength adjusting unit performs a wavelength conversion of the optical signal output from the multiplexing unit 213, passes the wavelength-converted optical signal through the waveguide 231, and makes the optical signal generate a propagation delay. The wavelength adjusting unit inputs the optical signal generated with the propagation delay, to the variable-dispersion compensation unit 232, thereby adjusting the dispersion compensation amount. With this arrangement, the wavelength of the optical signal can be adjusted to a specific wavelength.

In adjusting the wavelength of the optical signal to a specific wavelength, the wavelength can be adjusted using a wavelength shift device (the wavelength shift device 117 shown in FIG. 2) included in the constituent elements of the optical-variable delay units 210 to 204.

Characteristics of an optical multiplexing device according to a third embodiment are explained next. The optical multiplexing device according to the third embodiment incorporates a delay line that fixedly shifts the delay time from each channel. As explained above, when the optical multiplexing device incorporates a delay line, the optical multiplexing device can OTDM multiplex each optical signal in the state of light, without performing a complex delay adjustment.

Figure 12:
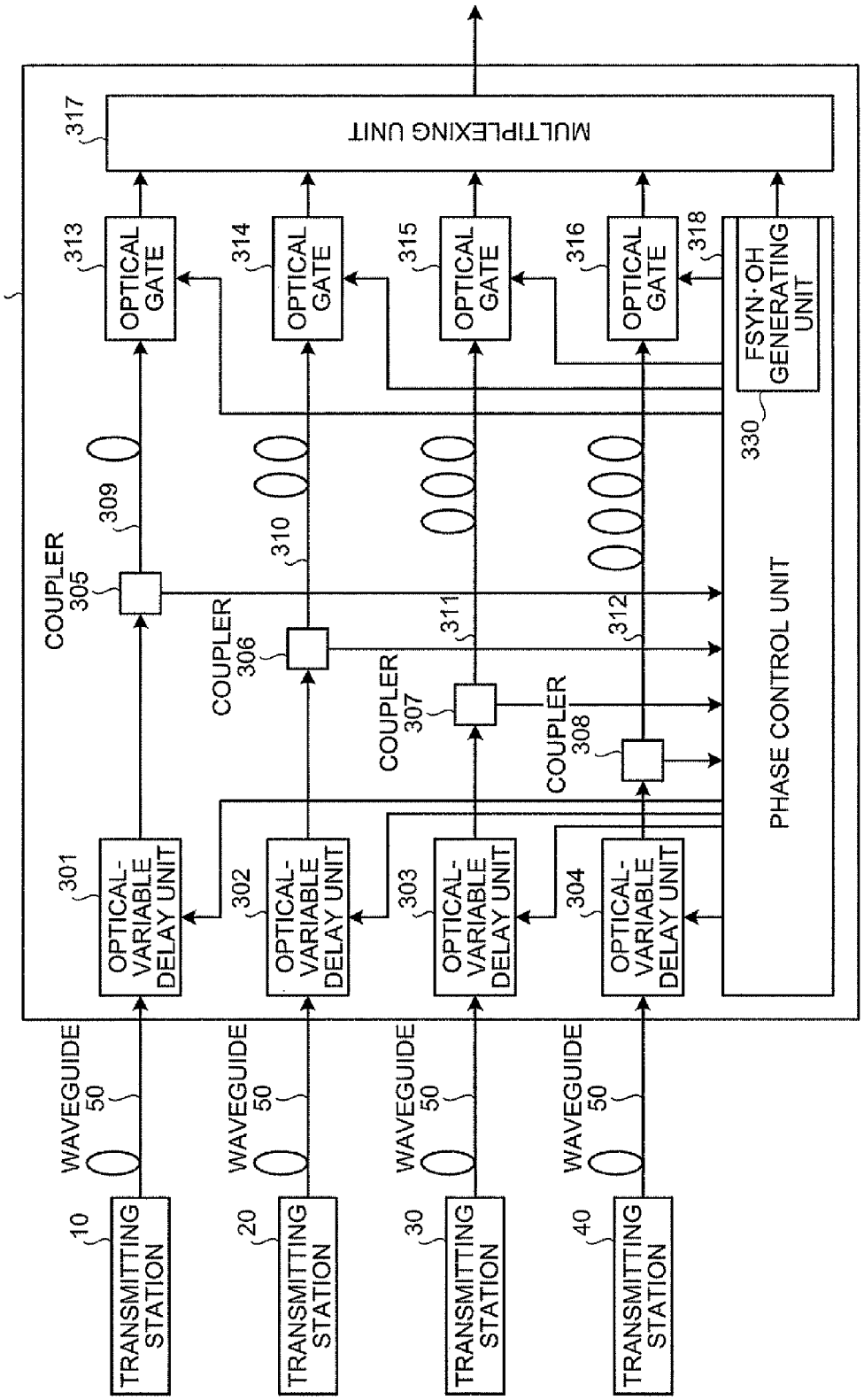
FIG. 12 is a functional block diagram of a configuration of an optical multiplexing device according to a third embodiment.

A configuration of an optical multiplexing device 300 according to the third embodiment is explained next. FIG. 12 is a functional block diagram of the configuration of the optical multiplexing device according to the third embodiment. As shown in FIG. 12, this optical multiplexing device 300 includes optical-variable delay units 301 to 304, couplers 305 to 308, delay lines 309 to 312, optical gates 313 to 316, a multiplexing unit 317, and a phase control unit 318.

The optical-variable delay units 301 to 304, the couplers 305 to 308, the optical gates 313 to 316, and the multiplexing unit 317 are similar to the optical-variable delay units 101 to 104, the couplers 105 to 108, the optical gates 109 to 112, and the multiplexing unit 113 shown in FIG. 1, respectively, and therefore explanations thereof will be omitted.

The delay lines 309 to 312 are waveguides that delay the optical signals passing through the delay lines 309 to 312 (corresponding to the length of the delay line). By adjusting the lengths of the delay lines 309 to 312, the delay amount of the optical signals output from the optical-variable delay units 301 to 304 can be adjusted freely. That is, when the optical-variable delay units 301 to 304 adjust the lengths of the delay lines 309 to 312 by making the phases of the optical signals coincide with each other, OTDM multiplexing of each optical signal can be executed. In the example of FIG. 12, the delay lines are long in the order of the delay lines 309, 310, 311, and 312. Therefore, the optical signals reach the optical gates in the order of the delay lines 309, 310, 311, and 312.

The phase control unit 318 is a processing unit that controls the optical-variable delay units 301 to 304 while change-over controlling the optical gates 313 to 316, and make the phases of the optical signals output from the optical-variable delay units 301 to 304 coincide with each other.

Figure 13:
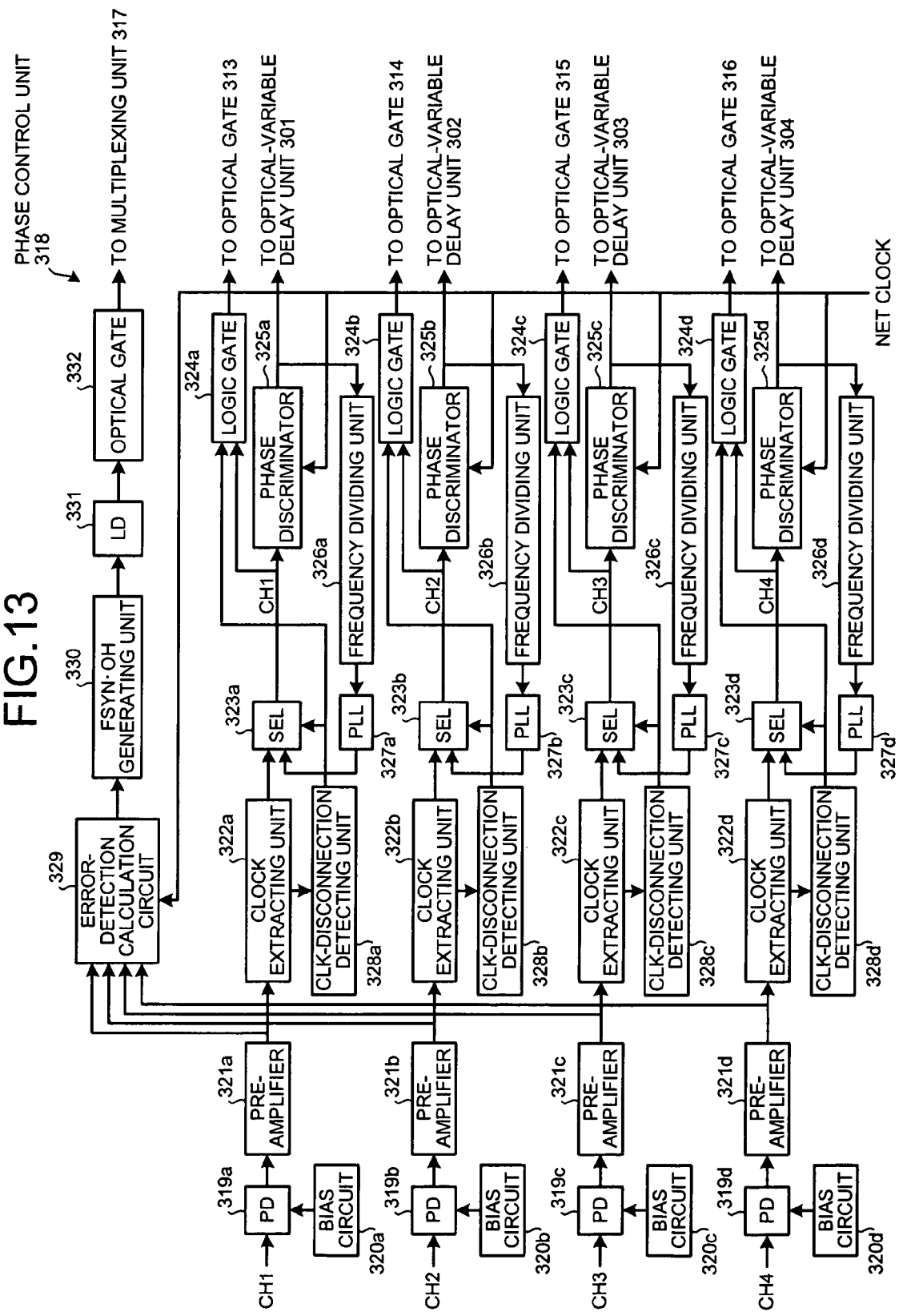
FIG. 13 is a functional block diagram of a configuration of a phase control unit shown in FIG. 12.

FIG. 13 is a functional block diagram of a configuration of a phase control unit shown in FIG. 12. As shown in FIG. 12, this phase control unit 318 includes PDs 319a to 319d, bias circuits 320a to 320d, preamplifiers 321a to 321d, clock extracting units 322a to 322d, SELs 322a to 322d, logic gates 324a to 324d, phase discriminators 325a to 325d, frequency dividing units 326a to 326d, PLLs 327a to 327d, CLK-disconnection detecting units 328a to 328d, an error-detection calculation circuit 329, an FSYN·OH generating unit 330, an LD 331, and an optical gate 332. Optical signals from the channels (CH1 to CH4) shown in FIG. 13 correspond to the optical signals input from the couplers 305 to 308.

The PDs 319a to 319d, the bias circuits 320a to 320d, the preamplifiers 321a to 321d, the clock extracting units 322a to 322d, the phase discriminators 325a to 325d, the frequency dividing units 326a to 326d, and the PLLs 327a to 327d are similar to the PD 131, the bias circuit 132, the preamplifier 133, the clock extracting unit 134, the phase discriminators 137a to 137d, the frequency dividing units 138a to 138d, and the PLLS 139a to 139d, respectively. Therefore, explanations thereof will be omitted.

The CLK-disconnection detecting units 328a to 328d are processing units that monitor clocks extracted by the clock extracting units 322a to 322d, and change over between clocks from the outside (clocks extracted from the clock extracting unit) and a self-running clock (net clock), when the monitored clock stops. The CLK-disconnection detecting units 328a to 328d are similar to each other. Therefore, the CLK-disconnection detecting unit is explained using the CLK-disconnection detecting unit 328a. SELs 323a to 323d and logic gates 324a to 324d explained below are similarly explained using the SEL 323a and the logic gate 324a.

The CLK-disconnection detecting unit 328a is a processing unit that monitors a clock signal extracted by the clock extracting unit 322a, that is, a clock concerning the optical signal from the channel 1, and changes over the clock by the external clock to the self-running clock, by controlling the SEL 323a and the logic gate 324a, when the clock stops.

That is, when the clock extracted by the clock extracting unit 322a is not stopped, the SEL 323a inputs the clock from the clock extracting unit 322a to the phase discriminator 325a and the logic gate 324a. On the other hand, when the clock extracted by the clock extracting unit 322a is stopped, the CLK-disconnection detecting unit 328a inputs the clock signal from the PLL 327a to the phase discriminator 325a and the logic gate 324a.

When the clock extracted by the clock extracting unit 322a is not stopped, the logic gate 324a changes over between the optical gates 313 following the external clock. On the other hand, when the clock extracted by the clock extracting unit 322a is stopped, the logic gate 324a changes over between the optical gates 313 based on the self-running clock.

The error-detection calculation circuit 329 is a device that monitors the electric signals of the channels 1 to 4 of which phases coincide with each other (at the point of time when the electric signal enters the error-detection calculation circuit 329, the optical signals of the channels 1 to 4 are converted to the electric signals by the PDs 319a to 319d), and calculates the error detection information. The error-detection calculation circuit 329 inputs the calculated error detection information to the FSYN·OH generating unit 330.

The FSYN·OH generating unit 330 is a processing unit that obtains error detection information from the error-detection calculation circuit 329, and generates overhead data based on the obtained information. The overhead data generated by the FSYN·OH generating unit 330 is converted into an optical signal by the LD 331, and is input to the multiplexing unit 317 via the optical gate 332.

As described above, the optical multiplexing device according to the third embodiment makes the phases of the optical signals output from the optical-variable delay units 301 to 304 coincide with each other, adjust the lengths of the delay lines 309 to 312, delays the optical signals, and combines the optical signals by the multiplexing unit 317. Therefore, the optical signals can be efficiently multiplexed without the need for performing complex control of the optical-variable delay units 301 to 304.

While the FSYN·OH generating unit 330 is built into the phase control unit 318 in the third embodiment, the FSYN·OH generating unit 330 can be also provided at a separate position.

Figure 14:
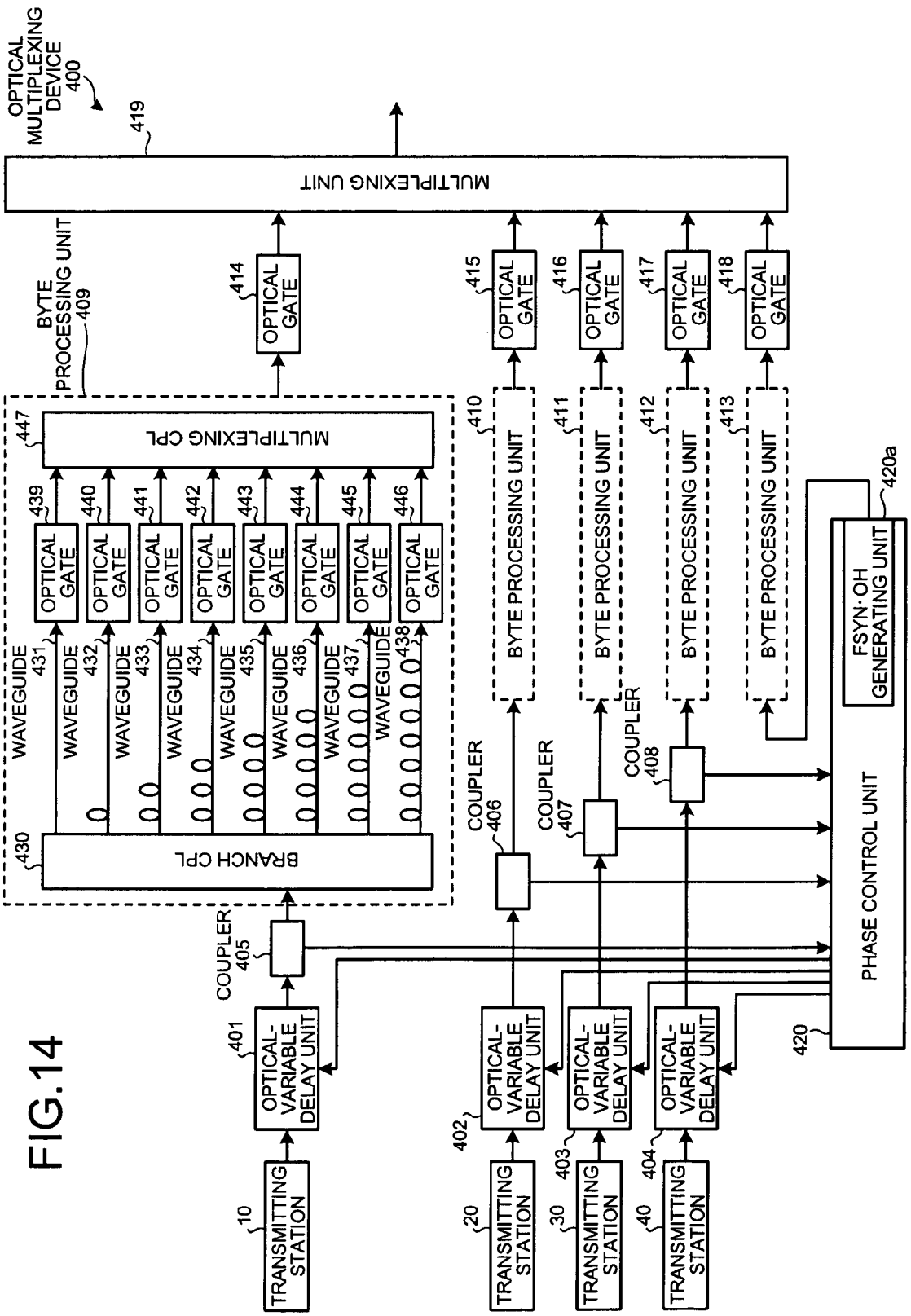
FIG. 14 is a functional block diagram of a configuration of an optical multiplexing device according to a fourth embodiment.

An optical multiplexing device according to a fourth embodiment is explained next. The optical multiplexing device according to the present embodiment executes a byte-interleaved multiplexing to each optical signal in the state of light. FIG. 14 is a functional block diagram of a configuration of an optical multiplexing device according to the fourth embodiment. As shown in FIG. 14, the optical multiplexing device 400 includes optical-variable delay units 401 to 404, couplers 405 to 408, byte processing units 409 to 413, optical gates 414 to 418, a multiplexing unit 419, and a phase control unit 420.

The optical-variable delay units 401 to 404, the couplers 405 to 408, the optical gates 414 to 418, the multiplexing unit 419, and the phase control unit 420 are similar to the optical-variable delay units 101 to 104, the couplers 105 to 108, the optical gates 109 to 112, the multiplexing unit 113, and the phase control unit 114 shown in FIG. 1, respectively, and therefore explanations thereof will be omitted. The byte processing units 409 to 413 are processing units that execute the byte-interleaved multiplexing. The byte processing units 409 to 413 are similar to each other, and therefore, the byte processing unit is explained using the byte processing unit 409.

The byte processing unit 409 includes a branch CPL 430, waveguides 431 to 438, optical gates 439 to 446, and a multiplexing CPL 447. The branch CPL 430 is a device that branches the optical signal input from the coupler 605, and inputs the branched optical signals to the waveguides 431 to 438.

The waveguides 431 to 438 transmit optical signals to the optical gates 439 to 446. The waveguides 431 to 438 have mutually different lengths, and therefore, a delay difference occurs in the optical signals passing through the waveguides. In the example shown in FIG. 14, waveguides are long in the order of the waveguides 431, 432, ..., 446. Therefore, the optical signal passing through the waveguide 431 first reaches the optical gate 439, and the optical signal passing through the waveguide 446 last reaches the optical gate 446.

The optical gates 439 to 446 are devices that perform on and off, following control signals from a control unit (not shown), and extract optical signals from the waveguides 431 to 438 at a predetermined timing. Optical signals output from the optical gates 439 to 446 are input to the multiplexing CPL 447. The multiplexing CPL 447 is a device that combines the optical signals output from the optical gates 439 to 446, and inputs the combined optical signal to the optical gate 414.

Figure 15:
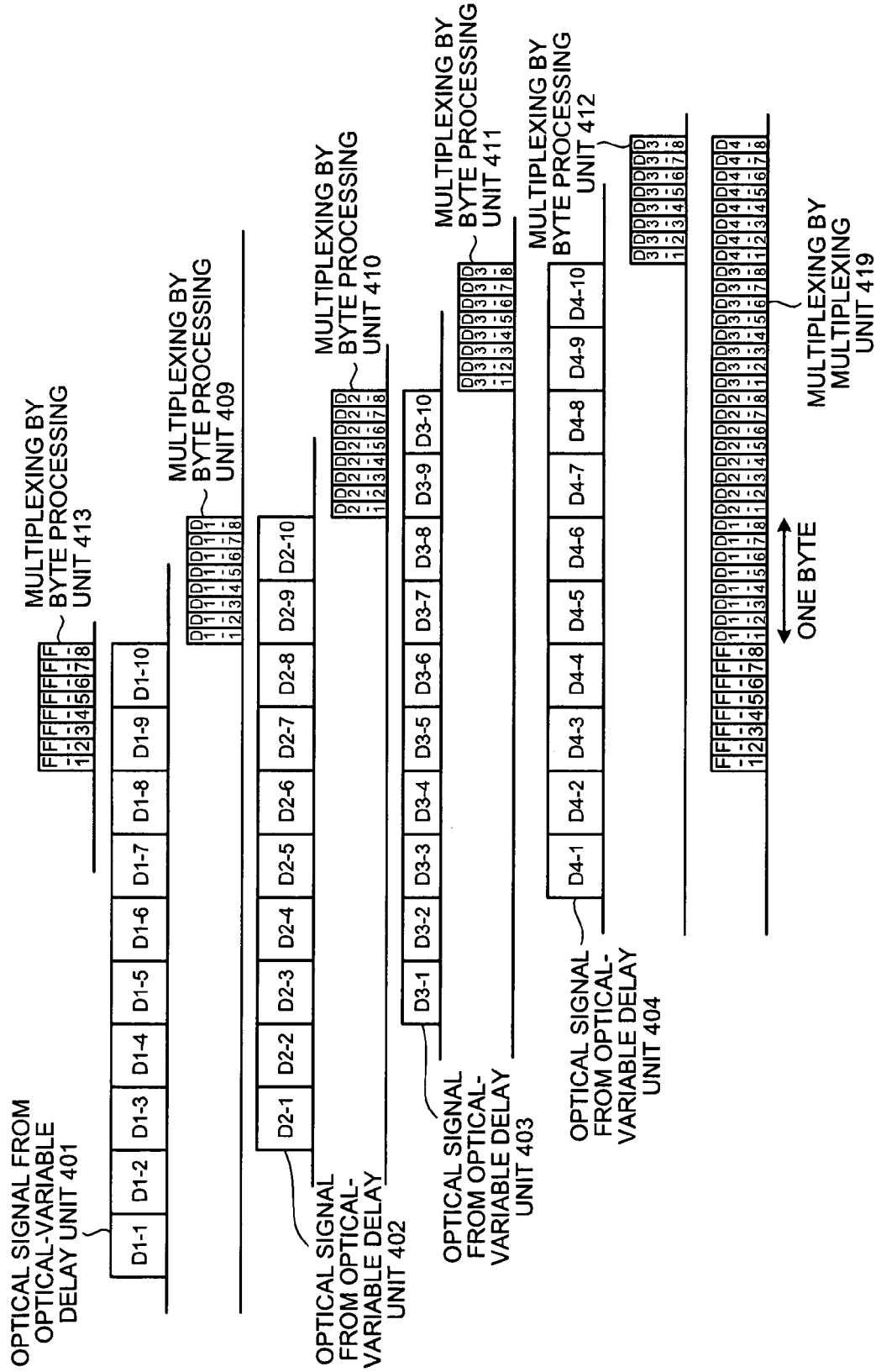
FIG. 15 is a time chart concerning an optical signal of the optical multiplexing device shown in FIG. 14.

FIG. 15 is a time chart concerning an optical signal of the optical demultiplexing device shown in FIG. 14. The byte processing units 409 to 412 execute the byte-interleaved multiplexing to the optical signals output from the optical-variable delay units 401 to 404, respectively. The byte processing unit 413 executes the byte-interleaved multiplexing to the overhead data generated by the FSYN·OH generating unit 420a. The optical signals multiplexed by the byte processing units 409 to 413 are input to the multiplexing unit 419, and the multiplexing unit 419 combines the multiplexed optical signals.

As explained above, in the optical multiplexing device 400 according to the fourth embodiment, the byte processing units 409 to 413 perform the byte-interleaved multiplexing of the optical signals in the state of light by using the branch CPL, the waveguides having different lengths, and the multiplexing CPL, the byte-interleaved multiplexing can be executed efficiently. Further, the multiplexing unit 419 can further OTDM multiplex the byte-interleaved multiplexed optical signal in the state of light.

Figure 16:
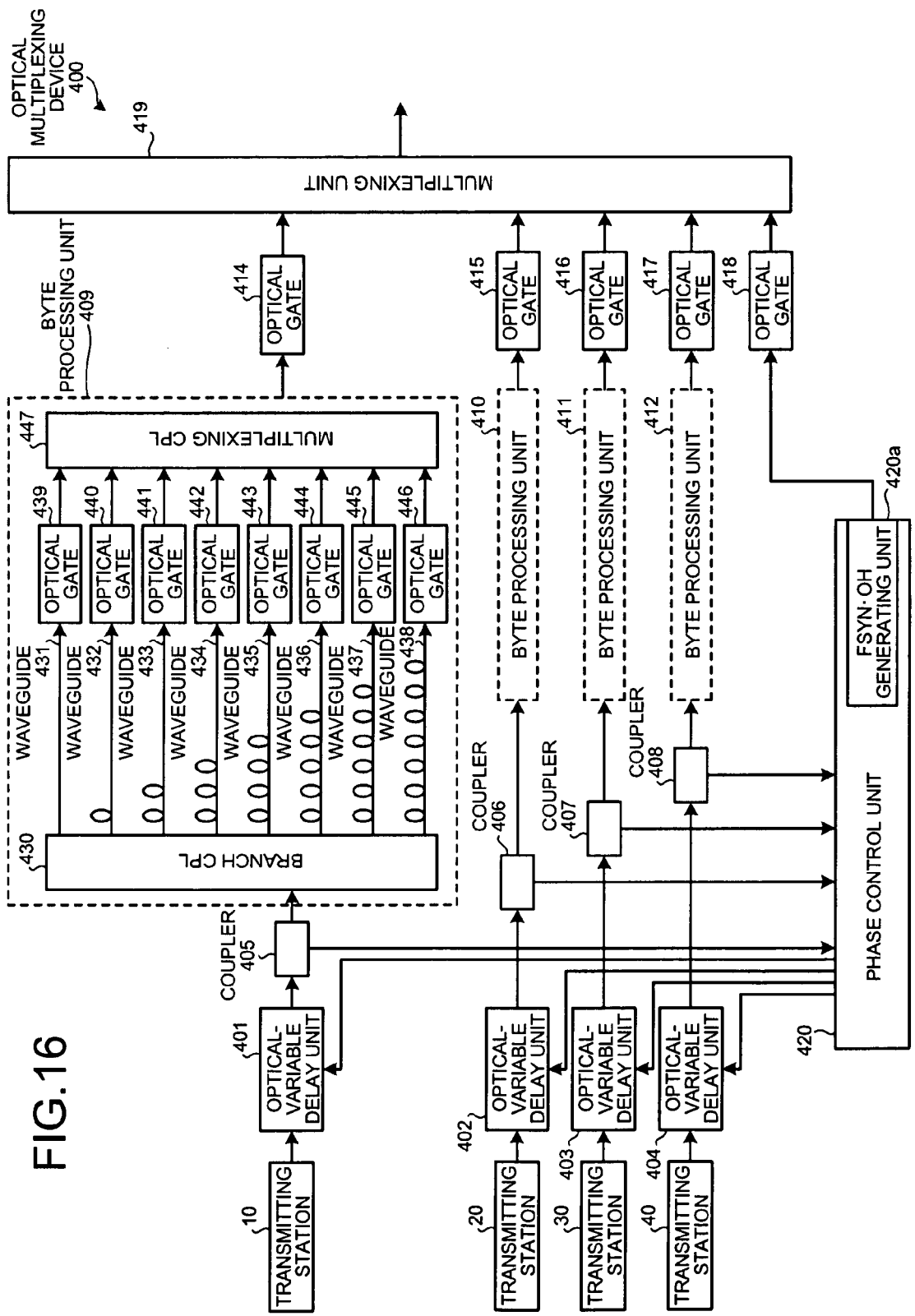
FIG. 16 is a functional block diagram of a configuration of an optical multiplexing device that multiplexes overhead data by a low-speed signal.

In the optical demultiplexing device 400 described in the fourth embodiment, the byte processing unit 413 multiplexes the overhead data generated by the FSYN·OH generating unit 420. Alternately, as shown in FIG. 16, the overhead data can be directly input to the optical gate 418, and the overhead data can be multiplexed by the low-speed signal. By multiplexing the overhead signal by the low-speed signal as described above, the optical demultiplexing device that becomes the receiving side can easily extract the timings.

Figure 17:
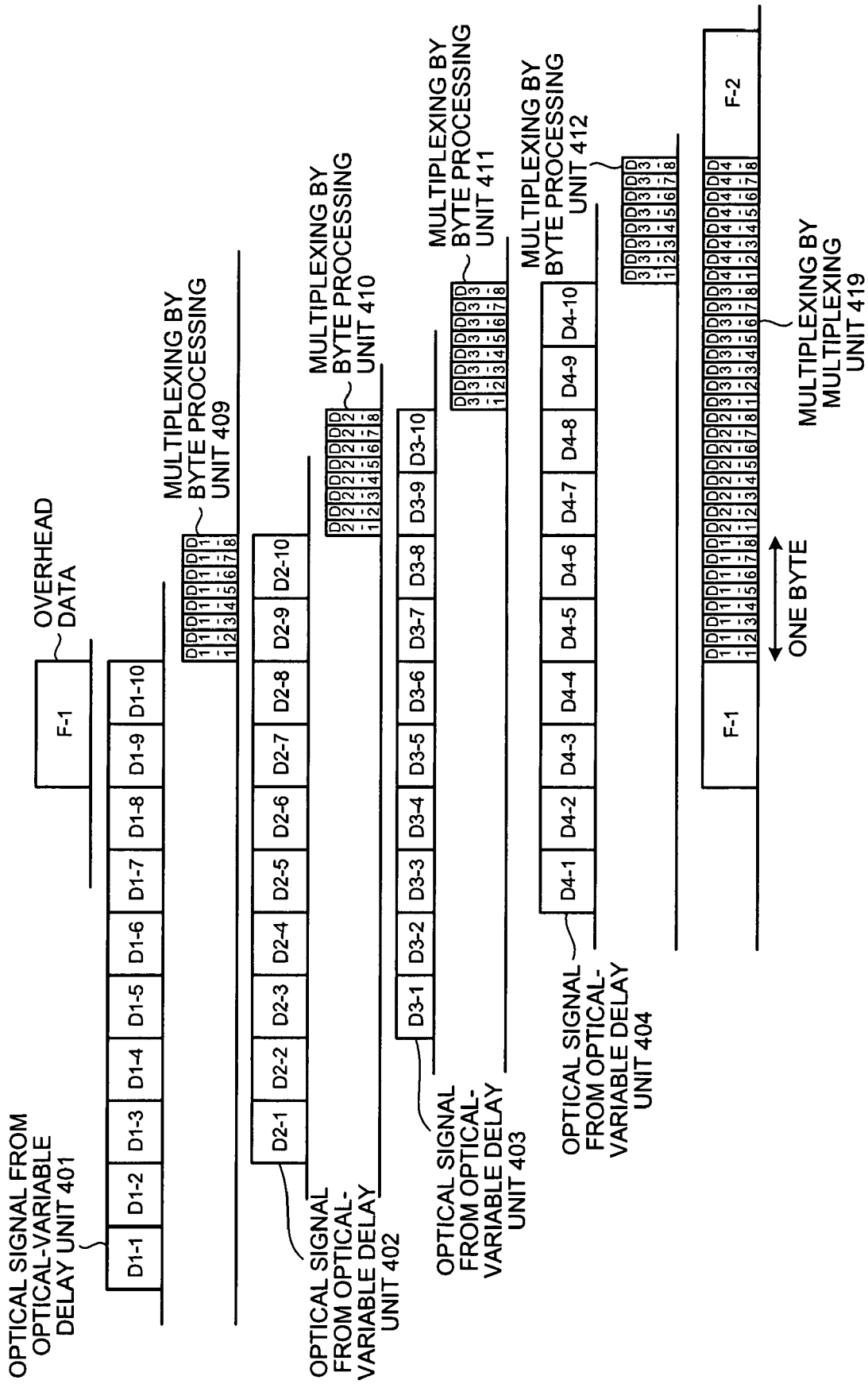
FIG. 17 is a time chart concerning an optical signal of the optical multiplexing device shown in FIG. 16.

FIG. 16 is a functional block diagram of a configuration of an optical multiplexing device that multiplexes the overhead data by a low-speed signal. Configurations of units are similar to those of the optical multiplexing device 400 shown in FIG. 14, and therefore explanations thereof will be omitted. In FIG. 16, the overhead data output from the FSYN·OH generating unit 420a is not input to the byte processing unit, and is input to the optical gate 418. FIG. 17 is a time chart concerning the optical signal of the optical multiplexing device shown in FIG. 16. As shown in FIG. 17, the multiplexing unit 419 combines the overhead data by the low-speed signal.

Figure 18:
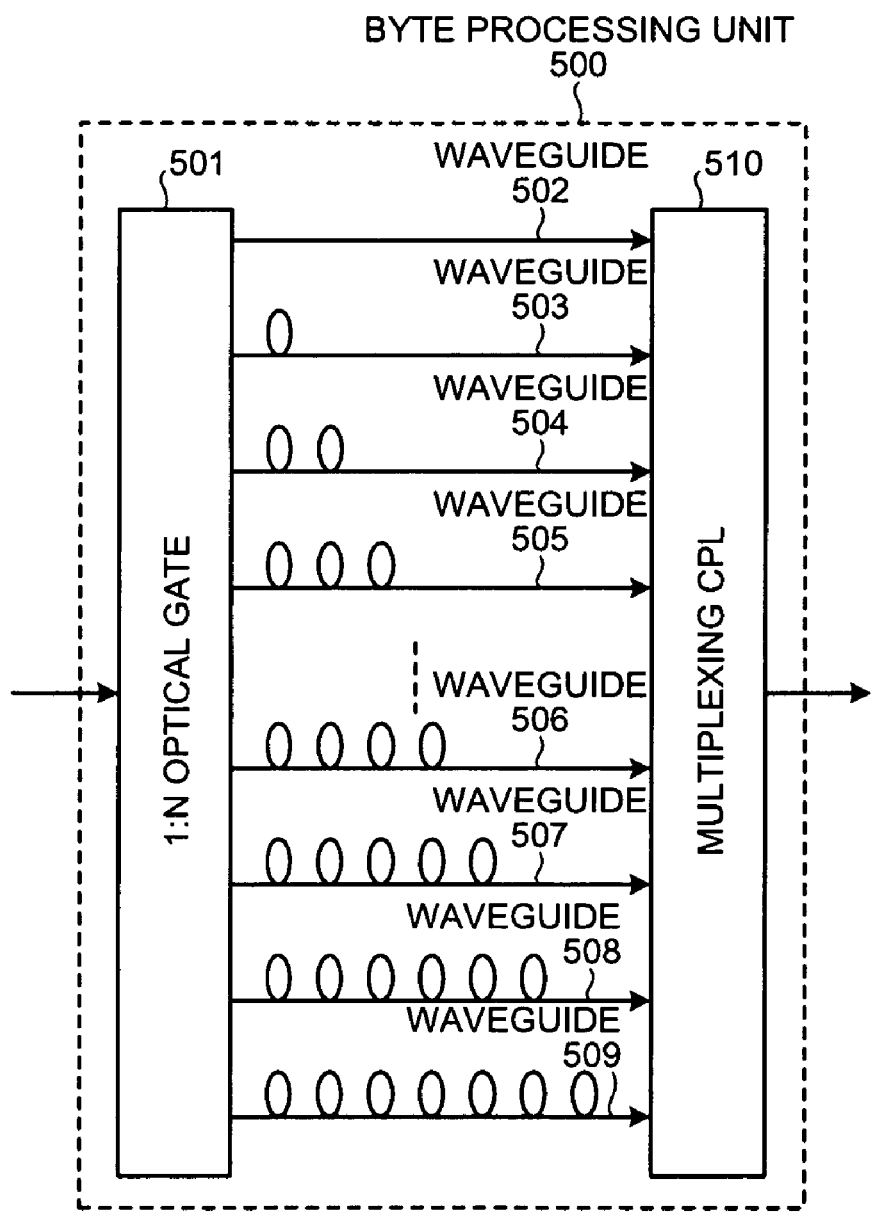
FIG. 18 is a modification (1) of a configuration of a byte processing unit.
Figure 19:
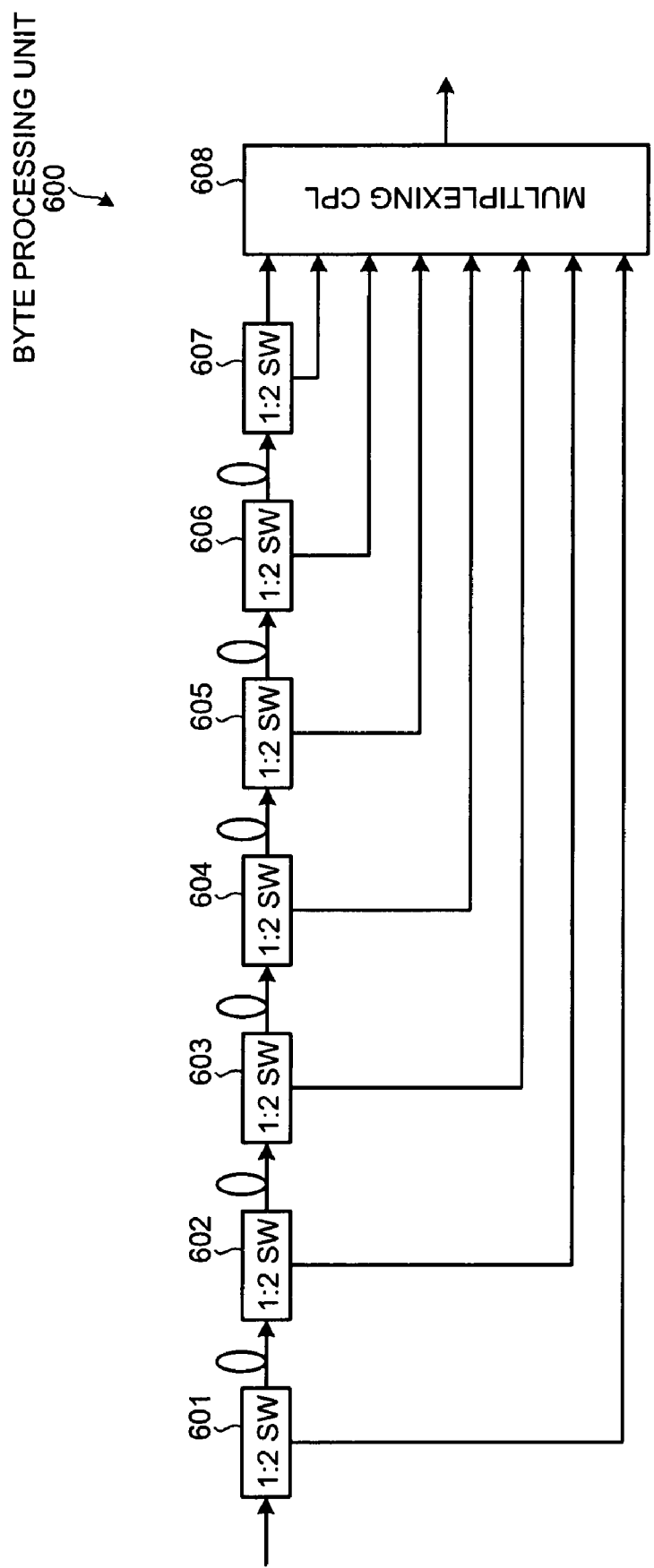
FIG. 19 is a modification (2) of a configuration of the byte processing unit.

The byte processing units explained with reference to FIG. 14 and FIG. 16 can be also have a configuration as shown in FIG. 18 or FIG. 19. FIG. 18 and FIG. 19 depict modifications of the configuration of the byte processing unit. As shown in FIG. 18, a byte processing unit 500 has a 1:N optical gate 501 that divides the optical signal into N (where N is two or more). The divided optical signals are input to waveguides (there are N waveguides) 502 to 509, and are delay adjusted. A multiplexing CPL 510 combines the delay-adjusted optical signals.

Alternatively, as shown in FIG. 19, the byte processing unit 600 connects in series plural 1:2 SWs (switches) 601 to 607 that divide the optical signal into two. The byte processing unit 600 divides the optical signal using the 1:2 SWs 601 to 607, and delay adjusts each optical signal. The multiplexing CPL 608 combines the optical signals.

When obtaining optical signals to be multiplexed, the optical signal multiplexing device according to the embodiment converts wavelengths of the obtained optical signals, passes the wavelength-converted optical signals through waveguides that make the optical signals generate propagation delays corresponding to the wavelengths, adjusts delay amounts of the optical signals, and compensates for degradation of waveforms of the optical signals. Therefore, there is an effect that the optical signals can be OTDM multiplexed in high precision even when transmitting stations that transmit optical signals are not remote-controlled.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical signal multiplexing device for multiplexing optical signals by an optical time-division multiplexing system, the optical signal multiplexing device comprising:
   a plurality of delay-amount adjusting units that convert wavelengths of a plurality of obtained optical signals to be multiplexed and adjust delay amounts of the optical signals by passing the wavelength-converted optical signals through waveguides that generate propagation delays corresponding to the wavelengths in the optical signals;
   a plurality of waveform-degradation compensation units that compensate for degradation of a waveform of the optical signals while keeping a difference of propagation delay times between the optical signals delay amounts of which are adjusted by the delay-amount adjusting units;
   a plurality of optical gates that extract the optical signals compensated by the waveform-degradation compensation units at respective timings different from each other; and
   a multiplexing unit that multiplexes the optical signals extracted by the optical gates and a control signal including control data corresponding to the respective timings.

2. The optical signal multiplexing device according to claim 1, further comprising:
   a wavelength converting unit that converts the wavelengths of the optical signals multiplexed by the multiplexing unit to a specific wavelength.

3. The optical signal multiplexing device according to claim 2, wherein the wavelength converting unit converts the wavelengths of the optical signals multiplexed by the multiplexing unit into a specific wavelength, by using mutual phase modulation by a semiconductor amplifier.

4. The optical signal multiplexing device according to claim 1, wherein the waveform-degradation compensation unit is an FBG dispersion compensator using a fiber Bragg grating filter.

5. The optical signal multiplexing device according to claim 1, wherein the waveform-degradation compensation unit is a VIPA compensator using a VIPA plate.

6. The optical signal multiplexing device according to claim 1, wherein the delay-amount adjusting units adjust the delay amounts of the optical signals using waveguides having different lengths.

7. The optical signal multiplexing device according to claim 1, wherein
the optical-signal multiplexing device is connected to a WDM multiplexing device that multiplexes optical signals by a wavelength-division multiplexing system, and
the optical-signal multiplexing device further comprises a conversion output unit that converts the wavelength of the optical signal multiplexed by the multiplexing unit into a waveform corresponding to the multiplexing by the wavelength-division multiplexing system, and outputs the converted optical signal to the WDM multiplexing device.

8. An optical signal multiplexing method for multiplexing optical signals by an optical time-division multiplexing system, the optical signal multiplexing method comprising:
obtaining a plurality of optical signals to be multiplexed;
converting wavelengths of the obtained optical signals;
adjusting delay amounts of the optical signals by passing the wavelength-converted optical signals through waveguides that generate propagation delays corresponding to the wavelengths in the optical signals;
compensating for degradation of a waveform of the optical signals while keeping a difference of propagation delay times between the optical signals having the adjusted delay amounts
extracting the optical signals after compensation for degradation of the waveform at respective timings different from each other; and
multiplexing the optical signals extracted and a control signal including control data corresponding to the respective timings.

9. The optical signal multiplexing method according to claim 8, further comprising:
converting the wavelengths of the multiplexed optical signals to a specific wavelength.

10. The optical signal multiplexing method according to claim 8, further comprising:
converting the wavelength of the multiplexed optical signal into a wavelength corresponding to a wavelength-division multiplexing system; and
outputting the converted optical signal to a WDM multiplexing device that multiplexes optical signals for the wavelength-division multiplexing system.

* * * * *